Jan. 7, 1930.    G. C. CARHART    1,742,805
CLUTCH CONSTRUCTION
Filed Jan. 19, 1926    2 Sheets-Sheet 2

INVENTOR.
George C. Carhart
BY Parsons & Rodell
ATTORNEYS.

Patented Jan. 7, 1930

1,742,805

UNITED STATES PATENT OFFICE

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK

CLUTCH CONSTRUCTION

Application filed January 19, 1926. Serial No. 82,174.

This invention relates to friction clutches and has for its object a particularly compact multiple disk friction clutch of large capacity, which can be installed in a location designed for a clutch of smaller capacity, and also a friction clutch which is cooled in a particularly simple and efficient manner. Other objects appear throughout the specification.

The invention consists in the novel features and in the combinations and constructions hereinafter set forth and claimed.

In describing this invention reference is had to the accompanying drawings in which like characters represent corresponding parts in all the views.

Figure 4 is a fragmentary developed plan view of the peripheral wall of the outer drum.

Figure 5 is a detail view illustrating the means for tightening the steel disks.

Figure 1:
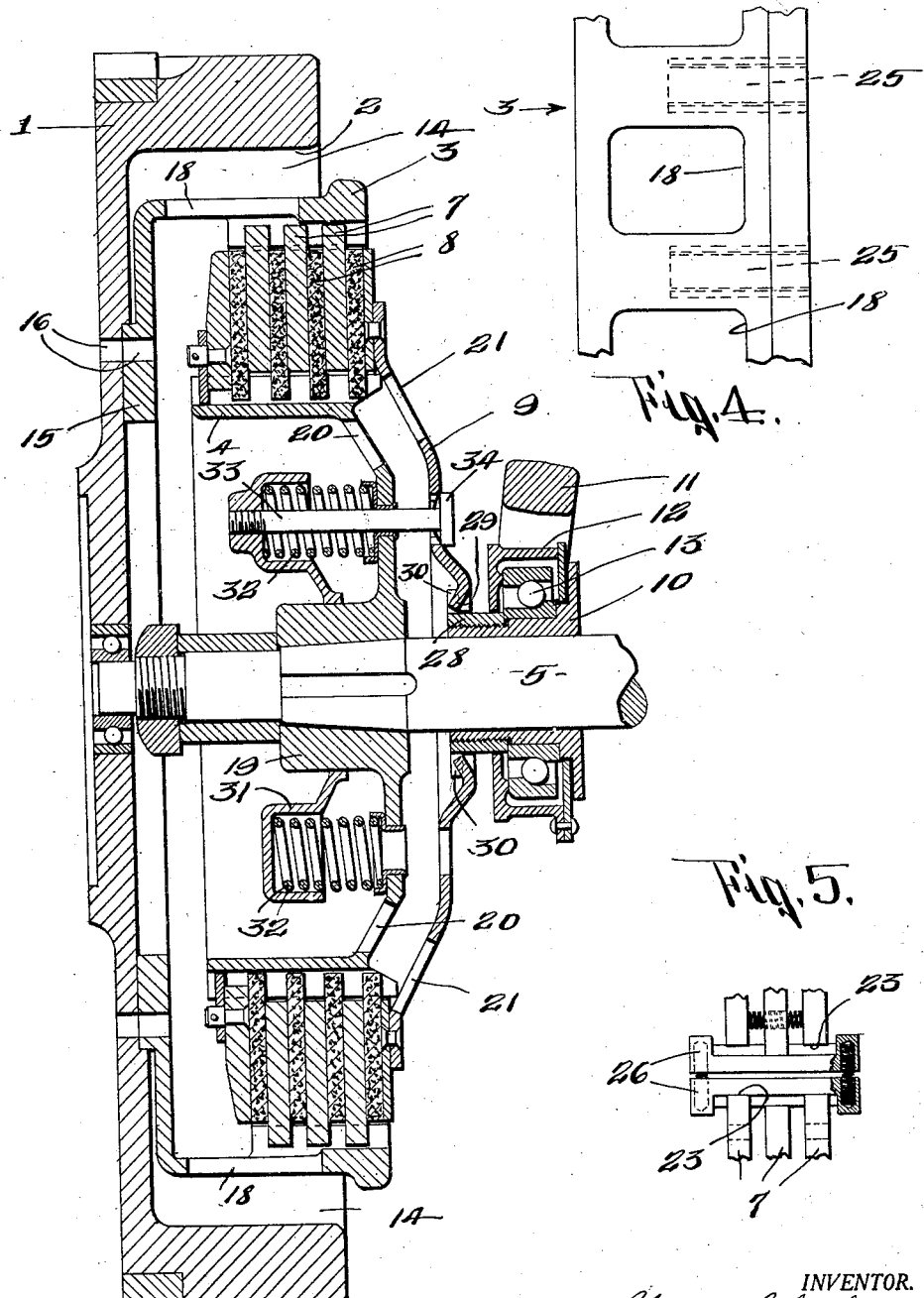
Figure 1 is a vertical sectional view of a clutch embodying my invention.
Figure 2:
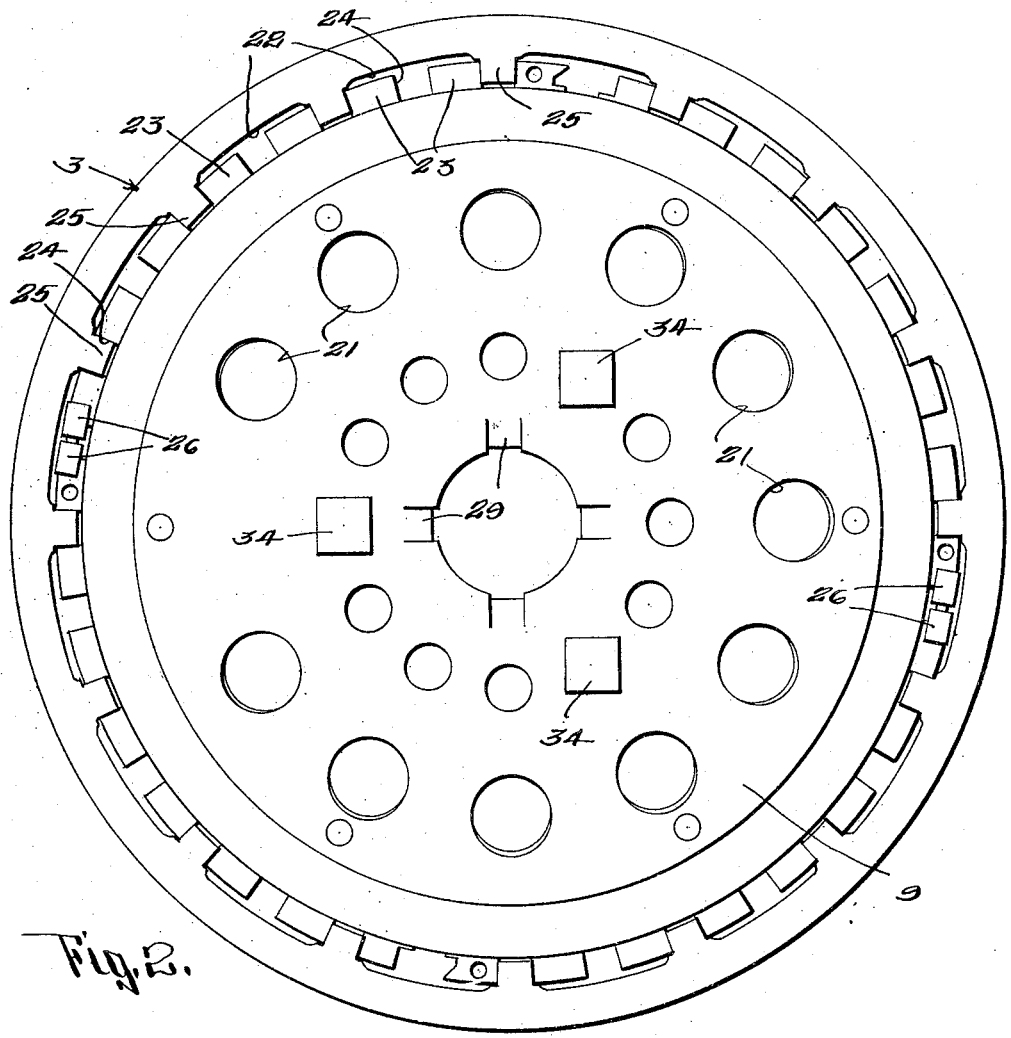
Figure 2 is a rear elevation of the clutch parts the shaft and throw-out collar being removed.
Figure 3:
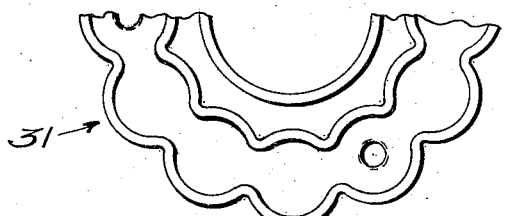
Figure 3 is a fragmentary view of the spring abutment of the clutch.

This clutch comprises generally outer and inner drums, interleaved disks interlocked respectively with the drums, spring means acting to compress the disks and throw-out means for relieving the disks of the pressure of the spring means, the outer and inner drums being formed with air passages by which air can be circulated through the drums, these air passages being so arranged that a current of air is created by the natural rotation of the drums, even when the clutch is mounted in a comparatively confined space such as the recess of a fly wheel adapted to receive a so-called single plate clutch.

1 designates a fly wheel of an ordinary automobile engine, this fly wheel being shown as having a cylindrical recess 2 therein opening through its rear face, the fly wheel here illustrated being adapted to receive a single plate clutch.

3 is the outer drum of the multiple disk clutch.

4 is the inner drum.

5 is the clutch shaft on which the inner drum is mounted.

7 and 8 are sets of interleaved disks interlocked respectively with the drums, and 9 the pressure plate or disk acting to compress the disks, and being acted upon by the clutch springs.

10 is the throw-out collar or sleeve slidable axially of the shaft and acting on the pressure plate or disk 9 to withdraw it against the action of the clutch springs, this being operated against the action of the clutch springs by the usual yoke 11 co-acting with the housing 12 enclosing a throw-out bearing 13. The yoke is actuated by the usual clutch pedal.

The outer drum is mounted in the recess 2 and spaced apart from the annular wall of the recess leaving an annular air space 14. The outer drum 3 also has a bottom 15 bearing against the bottom of the recess 2 and secured thereto in any suitable manner as by screws, bolts or rivets passed through alined holes 16 in the fly wheel, and in the bottom 15 of the outer drum 3. The outer drum is also formed with air passages 18 through its annular wall.

The inner drum 4 is mounted in the outer drum and has a hub 19 mounted on the shaft 5, and a web at the rear end of the drum connecting the hub and the drum proper, that is the annular wall of the drum. The inner drum 4 is open at its rear end and spaced apart from the bottom of the drum 3, also the web of the inner drum 4 is formed with air passages 20 therethrough. The pressure plate 9 is also formed with similar passages 21, thus during the rotation of the clutch air can circulate through the passages 21—20 through the inner drum to the rear side thereof through the outer drum and out through the passages 18 of the outer drum. When the clutch is disengaged but the engine running, air will pass between the friction plates.

One set of disks 7 and 8 are fiber or of fibrous friction material and provided with teeth of the same material, which interlock with one of the drums, and the other set of disks are metal or steel and have steel teeth which interlock with the other drum. The disks with the fiber teeth if they become loose do not rattle but the steel disks with the steel teeth do rattle and become noisy, if there is looseness between the teeth thereof and the teeth of the drum with which they are associated. This clutch is provided with means for tightening the steel disks against rattling or looseness.

As here illustrated the series of disks 8 which interlock with the inner drum 4 are fiber disks and the disks 7 which interlock with the outer drum 3 are steel. The disks 7 are provided with teeth or projections of approximately the same width. The outer drum 3 is provided with spaces for receiving the projections of the disks 7 and with projections extending into the spaces between the teeth of the disks 7, the spaces of the drum being of as great width as a plurality of teeth and the intervening space of the disks 7.

As here shown the spaces 22 of the outer drum are of a width as great as the combined width of two teeth 23 of the disks 7, and the intervening space 24, while the internal projections 25 of the outer drum are of such width as to fit one of the spaces 24 between the teeth of the disks 7. As seen in Figure 4 the air passages 18 of the outer drum open through the portions of the spaces 22, and are of as great width as said spaces 22 so that a maximum cooling of the clutch is effected.

Means as wedges 26 are provided at intervals between the projections 23 of the disks 7. These wedges are spring pressed in opposite directions and act to thrust some of the disks 7 in one direction about their axis, and the other disks 7 in the opposite direction about their axis thus tightening them in the spaces 22 against looseness.

This tightening means forms no part of this invention, but forms the subject matter of my application Serial Number 79,448, filed January 5, 1926.

The pressure plate 9 is suitably interlocked with the throw-out collar 10 or a sleeve 28 threading thereon, and as here shown the pressure plate is formed with a central bore and lugs 29 adjacent said bore, the lugs being bent into notches 30 in a flange on the sleeve 28 to interlock the pressure ring 9 with the throw-out collar 10, the portions of the pressure plate 9 between the lugs engaging the rear face of such flange so that a throw-out movement of the collar 10 is transmitted to the pressure plate. The clutch spring means is located within the inner drum in a particularly simple and compact manner. As here illustrated, an annular spring abutment 31 is located in the inner drum on the hub 19 thereof, and an annular series of springs 32 is located between this abutment and the web of the inner drum 4. The abutment is connected to the pressure plate by means of tie rods 33 extending through the pressure plate 9 at the head of the drum 4, and threading into the abutment 31, the tie rods having heads 34 at their outer ends thrusting against the pressure plate. The rods extend axially through some of the springs 32.

As here illustrated there are three tie rods 33 and twelve springs. This clutch is particularly advantageous in that it is particularly compact in construction and of particularly great capacity for its size it being of such size as to be placed into a space usually designed for a single plate clutch.

What I claim is:—

1. In a clutch the combination of outer and inner drums and sets of interleaved disks interlocked respectively with the drums, one set of disks being formed with projections and the drum coacting therewith having complemental spaces of a greater width than the width of a plurality of projections on the disk and means interposed between some of such projections of the disks for thrusting adjacent disks in opposite directions and thus fitting them against the side walls of such spaces.

2. A clutch construction comprising outer and inner drums, sets of interleaved disks interlocked respectively with the drums, the outer drum being formed with internal spaces and projections and the disks interlocked therewith being provided with peripheral projections and spaces between them, the spaces of the outer drum being of a greater width than a plurality of the projections of the disks and the outer drum having passages through its annular wall opening through the bottom of such spaces in the outer drum.

3. A clutch construction comprising outer and inner drums, sets of interleaved disks interlocked respectively with the drums, the outer drum being formed with internal spaces and projections, and the disks interlocked therewith being provided with peripheral projections and spaces between them, the spaces of the outer drum being of a greater width than a plurality of the projections of the disks and the outer drum having passages through its annular wall opening through the bottom of such spaces, the inner drum being formed with air passages therethrough.

4. The combination with a fly wheel having a recess opening through its rear face, of a clutch comprising outer and inner drums, sets of interleaved disks interlocked respectively with the drums, a shaft on which the inner drum is mounted, spring means for compressing the disks and throw-out means for relieving the disks of the pressure of the spring means, the outer drum being located within the recess and spaced apart from the annular wall thereof and the inner drum having air passages therethrough, the outer drum being also formed with spaces for receiving peripheral teeth on the set of disks interlocked therewith, the width of each space of the outer drum being as great as two of the teeth of the disks coacting therewith and the space between such teeth, means coacting with the outer drum to thrust the disks of one set in opposite directions to tighten them against the walls of the spaces of the outer drum and air spaces in the outer drum opening through the bottoms of the spaces of the outer drum.

In testimony whereof, I have hereunto signed my name, at Syracuse, in the county of Onondaga, and State of New York, this 9th day of January, 1926.

GEORGE C. CARHART.